Jan. 5, 1937.  S. L. VAN METER, JR  2,066,810
AIRCRAFT
Filed Oct. 3, 1933   5 Sheets-Sheet 1
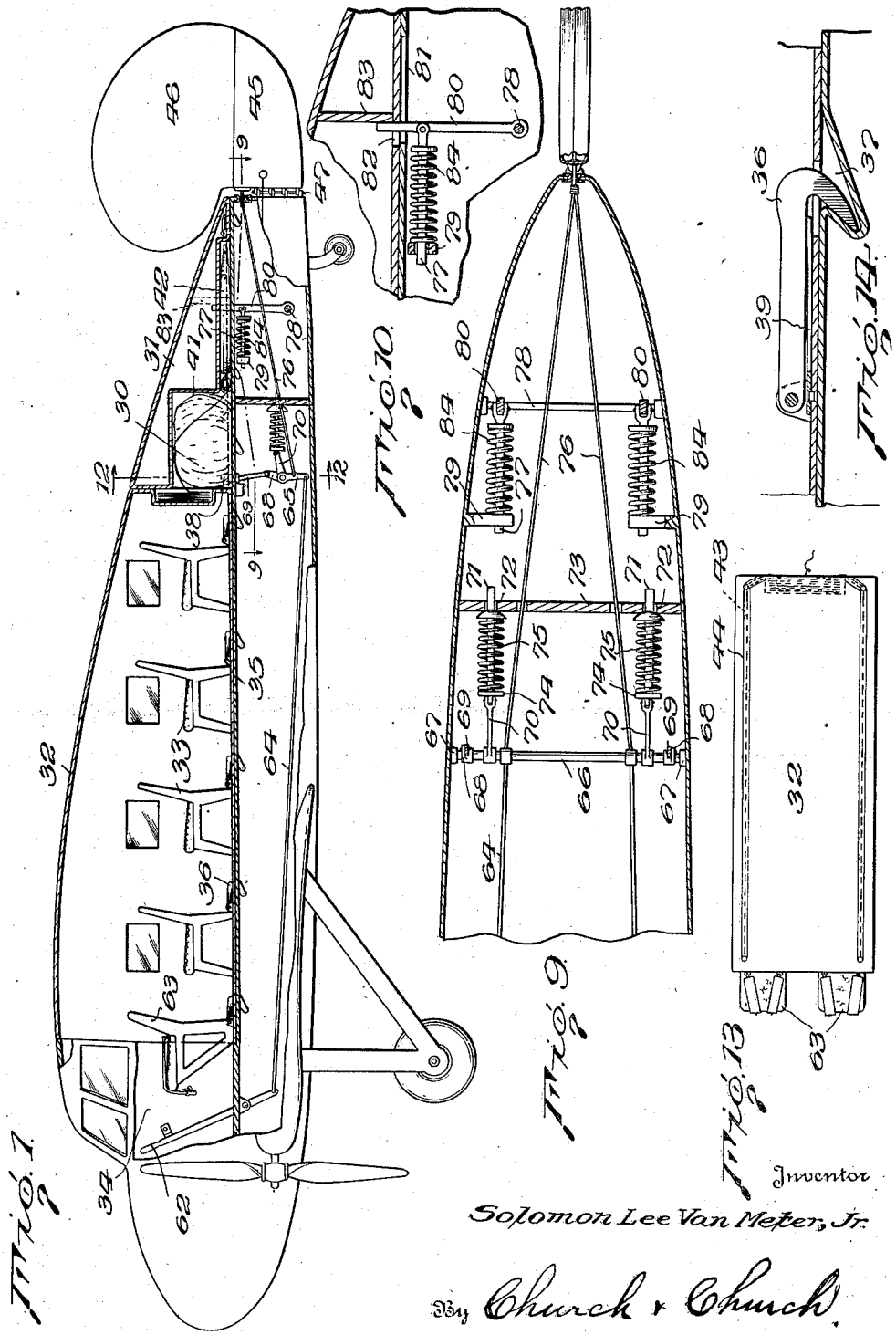
Inventor
Solomon Lee Van Meter, Jr.
By Church & Church
His Attorneys

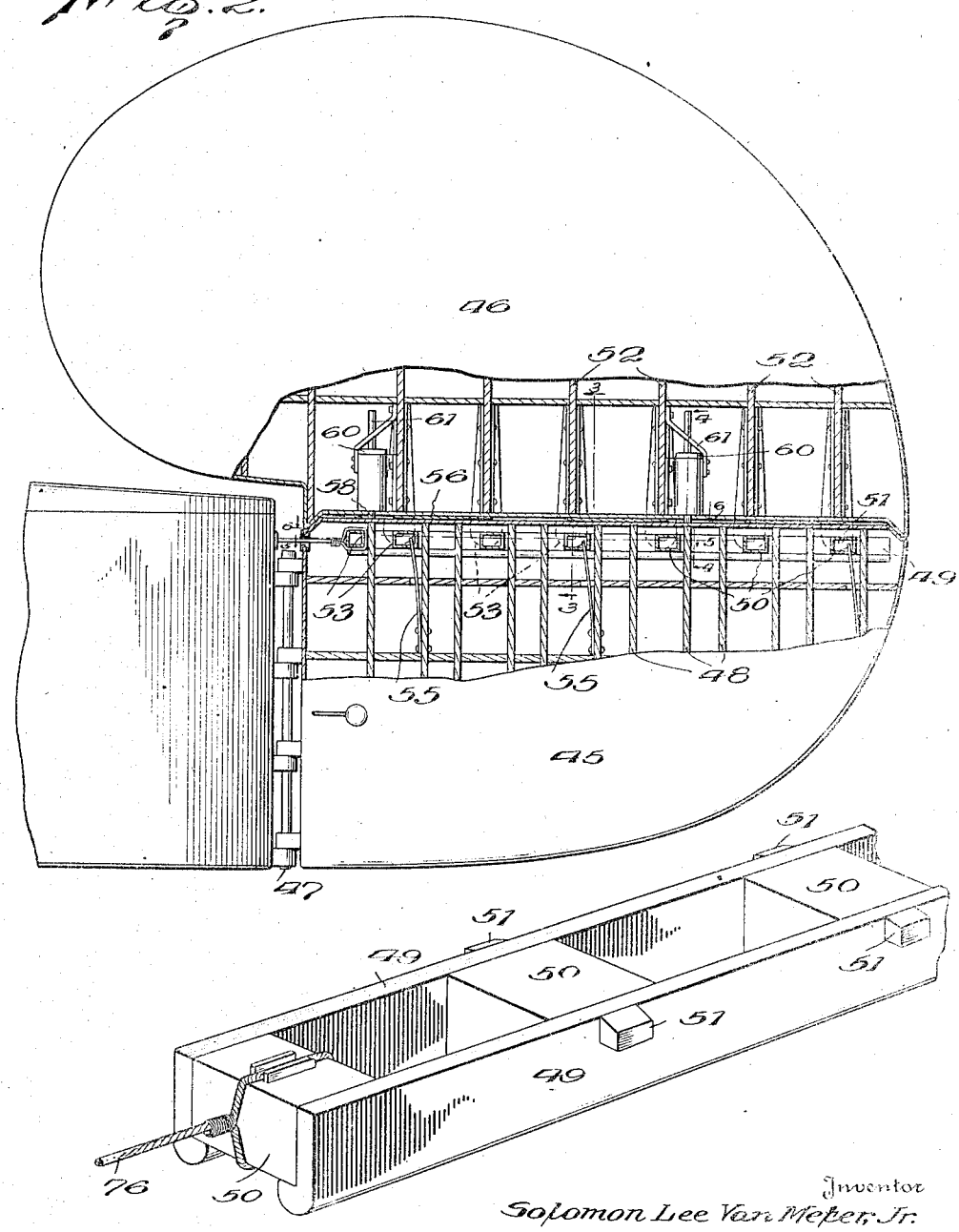

Jan. 5, 1937.　　S. L. VAN METER, JR　　2,066,810
AIRCRAFT
Filed Oct. 3, 1933　　5 Sheets-Sheet 3
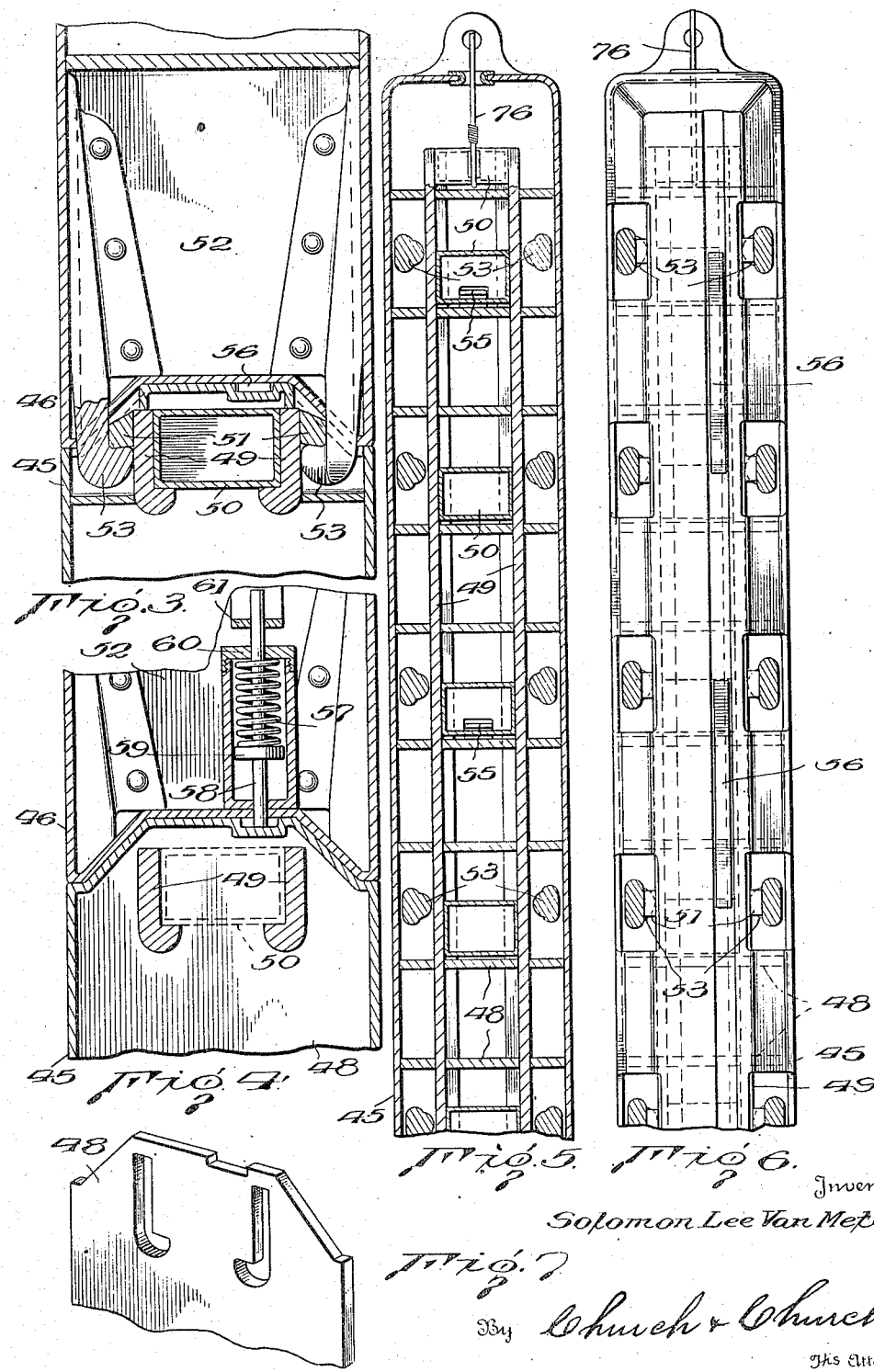
Inventor
Solomon Lee Van Meter, Jr.
By Church & Church
His Attorneys

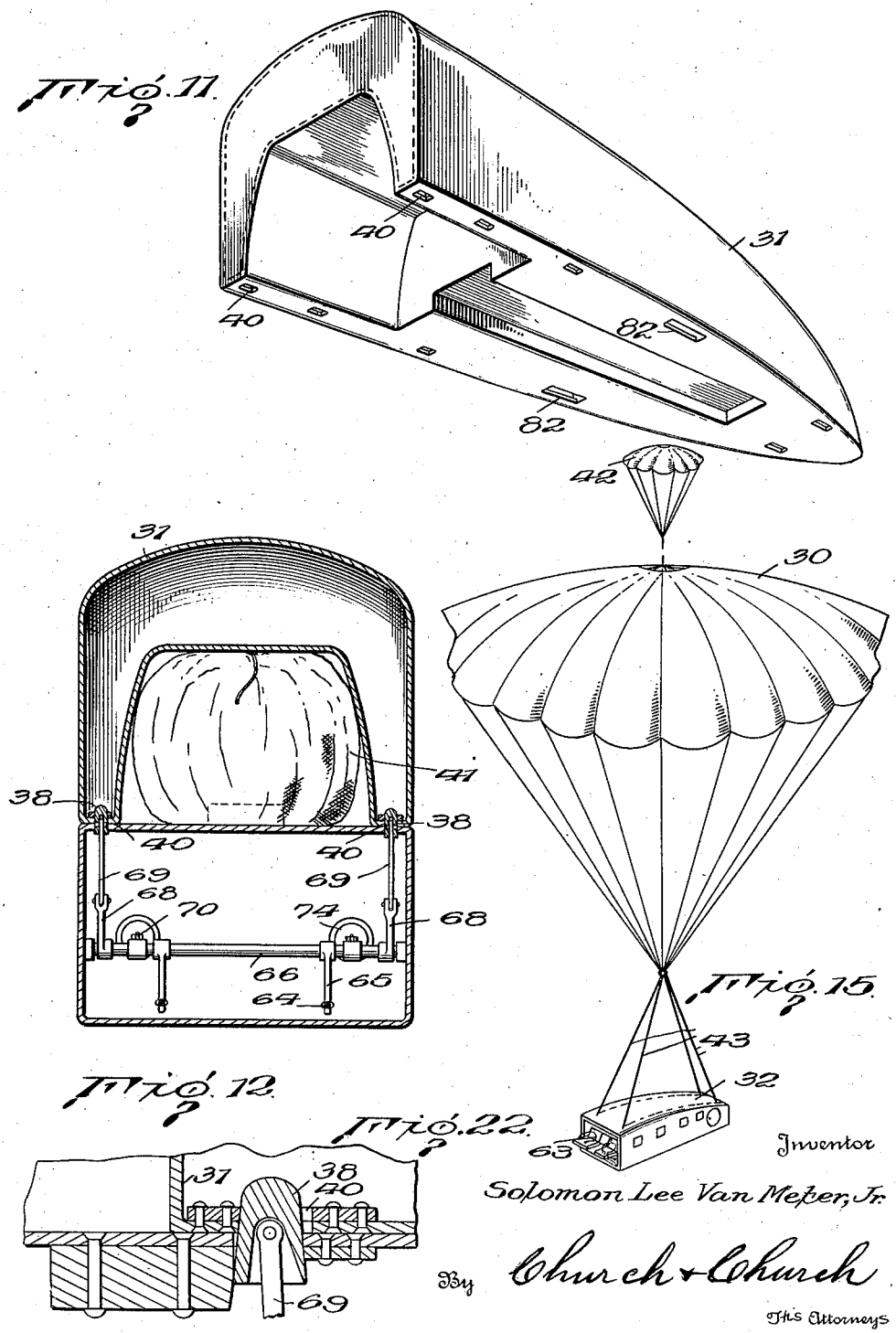

Jan. 5, 1937.  S. L. VAN METER, JR  2,066,810
AIRCRAFT
Filed Oct. 3, 1933  5 Sheets-Sheet 5
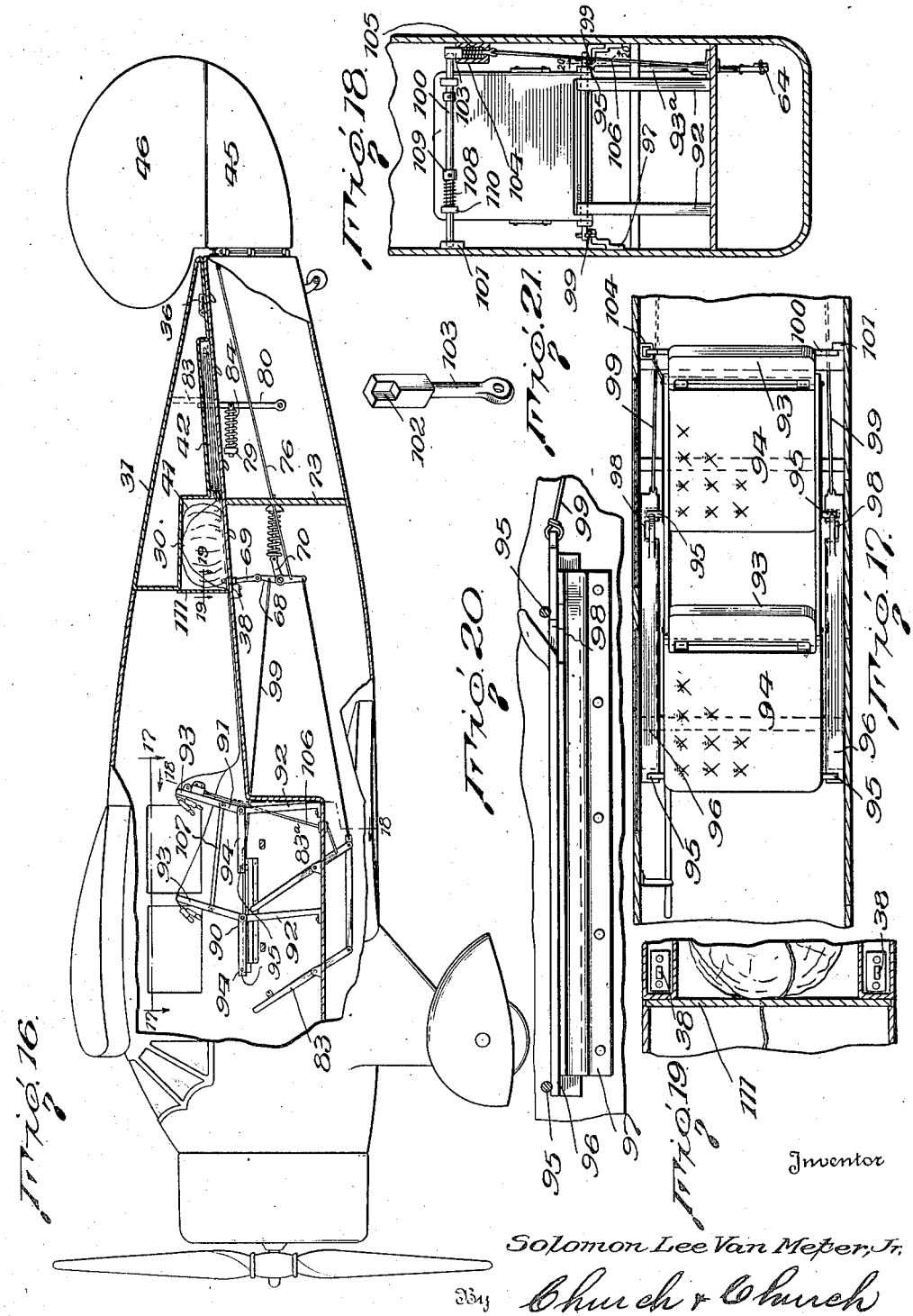
Inventor
Solomon Lee Van Meter, Jr.
By Church & Church
His Attorneys Patented Jan. 5, 1937

2,066,810

UNITED STATES PATENT OFFICE 2,066,810

AIRCRAFT

Solomon Lee Van Meter, Jr., Lexington, Ky.

Application October 3, 1933, Serial No. 692,022

15 Claims. (Cl. 244—87)

This invention relates to improvements in aircraft and particularly to emergency appliances or arrangements by which the occupants of the craft, independently of the machine, or the occupants together with that portion of the machine occupied by the passengers, may be safely landed by means of a parachute.

In the present arrangement, the parachute is attached to the passengers, or to that portion of the craft occupied by the passengers, and, in an emergency, the parachute is released or freed by one of the passengers, usually the pilot, whereupon the parachute becomes operative to safely land its load, i. e., either the passengers or the portion of the craft occupied by them. In other words, the seat pack or back pack type of parachute now standard equipment is not utilized for reason fully described in my prior Patent No. 1,874,392, dated August 30, 1932. In arrangements such as the present, it is absolutely necessary to prevent the body of fuselage of the craft fouling the parachute. The primary object of the invention, therefore, is to provide an arrangement whereby the parachute is released from the upper portion of the aircraft body and all portions of the craft, including the rudder, in the rear of the place of storage of the chute, and above the point of release of the parachute, are cleared away at the same time as or in advance of, the release of the parachute whereby all possibilities of the latter becoming entangled in the falling craft are eliminated. Preferably, the upper portion of the rudder and body of the craft at the rear of the parachute are detachably secured to other portions of the craft but, when released, are catapulted into space although such detachability and complete removal may not be essential.

Another object is the provision of means for releasing and catapulting into space the removable portions of the craft housing the parachute and the upper portions of the rudder.

Another object consists in providing a sectional rudder, one section being removable to prevent fouling the parachute and a novel form of securing devices for said removable section which will facilitate the release and removal of said section.

In the preferred construction there is what for convenience will be termed the craft body proper, to which the compartment for the pilot and passengers and the housing for the parachute, are detachably secured, and a still further object is to arrange said housing next adjacent to the passenger compartment, and lock the housing to said body by means that will aid in preventing accidental detachment of said compartment.

Another object of the invention contemplates an airplane having one or more seats in the cockpit, said seat or seats having collapsible bottoms and backs supported by means removable in connection with the mechanism for releasing the parachute.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a side view of an aircraft, partly in section and partly in elevation, illustrating the preferred embodiment of the present invention;

Fig. 2 is a somewhat larger view, partly in side elevation and partly in section, illustrating, in detail, the preferred construction of rudder;

Fig. 3 is a vertical section on the line 3—3 of Fig. 2;

Fig. 4 is a similar view on the line 4—4 of Fig. 2;

Fig. 5 is a horizontal section on the line 5—5 of Fig. 2;

Fig. 6 is a like view on the line 6—6 of Fig. 2;

Fig. 7 is a detail perspective view of one of the truss members in the lower section of the rudder;

Fig. 8 is a detail perspective view of the locking bar for detachably securing the upper rudder section to the lower section of said rudder;

Fig. 9 is a transverse sectional view on the line 9—9 of Fig. 1;

Fig. 10 is a detail vertical section showing in detail the means for catapulting the parachute housing off the craft body;

Fig. 11 is a detail perspective view of the removable parachute housing;

Fig. 12 is a vertical section on the line 12—12 of Fig. 1;

Fig. 13 is a top plan view of the cabin or passenger compartment;

Fig. 14 is a detail section showing one of the securing elements for retaining the cabin and parachute housing on the craft body;

Fig. 15 is a perspective view illustrating the cabin suspended from the opened parachute;

Fig. 16 is a vertical longitudinal section of an airplane of the "two-seater" type in which the occupants, independently of the fuselage or any portion thereof, constitute the load on the parachute;

Fig. 17 is a longitudinal horizontal section on the line 17—17 of Fig. 16;

Fig. 18 is a vertical transverse section on the line 18—18 of Fig. 16;

Fig. 19 is a horizontal section on line 19—19 of Fig. 16;

Fig. 20 is a section on line 20—20 of Fig. 18;

Fig. 21 is a detail illustration of one of the seat back supporting elements, and Fig. 22 is an enlarged sectional view of the retractile bar.

In each instance, the passengers are freed from the upper surface of the craft. In the preferred instance the passengers remain in the cabin to which the parachute is attached, while in the structure shown in Figs. 16 to 21, is connected directly to the passengers themselves. The rudder is made of sections and the parachute stored in the upper portion of the craft body or fuselage forward of the rudder, preferably in a detachable housing. When the parachute is released in an emergency, it is essential that fouling by the rudder at the rear of the craft be impossible so, for this reason, one section of said rudder is adapted to be moved from the normal path of the released parachute. Preferably, this rudder section is detachable and adapted to be catapulted into space somewhat in advance of the release of the parachute.

Referring to Figs. 1 to 15, the parachute 30 is stored in the upper portion of the craft, this portion, indicated at 31, being detachable from the craft. Immediately forward of housing 31 is the cabin or passenger and pilot compartment 32 provided with seats 33. The forward end of the cabin terminates just to the rear of the compartment 34 for the controls and other navigating instruments (not shown). Both the cabin 32 and housing 31 are detachably secured to the craft. For instance, the fuselage or body proper may comprise a longitudinally extending, transversely disposed partition 35 on which the cabin and housing normally rest, said partition, cabin and housing being provided with interlocking retaining elements in the form of hooks 36 engaging in recesses 37. In the present instance, the hooks are pivoted on the lower portion of the cabin with their free ends normally engaged in the recesses. The housing 31 abuts the rear wall of the cabin and is normally held against movement rearwardly of the craft by retractile bars 38 projecting through slots 40 in partition 35 and the bottom wall of the housing. Springs 39 interposed between the shanks of hooks 36 and the walls of the cabin and housing tend to disengage the hooks from recesses 37 but by having the bars 38 tapered and engaging the slots 40 with a wedging action, the housing and cabin are urged forwardly of the craft with the result that the structural parts are in close assembly and the hooks 36 cannot be accidentally disengaged from their locking recesses. The main parachute can be stored in its housing in various ways but preferably it is loosely contained within a canvas covering 41 whose free edge portions or flaps are loosely held beneath the packaged parachute by the weight of the latter. In accordance with customary practice the main parachute 31 has attached thereto a pilot parachute 42 also stored in the housing. The main parachute is also attached to its load, the cabin, by a plurality of cables 43, one cable being secured to each corner of the upper surface of the cabin. Those portions of cables 43 which would otherwise be exposed, are normally located in elongated recesses 44 in the top of the cabin and protected by a covering of material that will readily rip when the parachute and cabin are released from the craft.

It is evident that when the parachutes are freed, with the plane in motion, the normal movement of the parachute would be rearwardly of the plane body, under which circumstances there would be great danger of the upper portion of the rudder fouling them. Therefore, that portion of the rudder most apt to foul the parachutes is adapted to be manipulated to clear the normal path of the parachutes. Preferably, the rudder is composed of lower and upper sections 45, 46, section 45 being pivotally mounted on a vertical axis at 47 and the upper section 46 detachably secured to said pivotal lower section. Within rudder section 45 are a plurality of transverse truss members 48 slotted to receive a slidable locking member composed of side bars 49 connected by spacer elements 50. Mounted on the outer side surfaces of bars 49 are wedge blocks 51, each block being tapered rearwardly of the rudder. The upper rudder section 46 also comprises truss members 52 to which are attached locking members in the form of hooks 53 adapted to engage the wedge shaped blocks 51. Mounted on certain of the truss members 48 in lower rudder section 45 are springs 55 engaging the spacer members 50 of the locking bar. These springs 55 urge the locking bar rearwardly so that the tapered blocks 51 engage the hooks 53 with a wedging action to insure the rigidity of the rudder under normal conditions. In order to instantly clear the upper rudder section away, when released, springs 56 are interposed between the juxtaposed surfaces of the two rudder sections and springs 57 on rods 58 are interposed between collars 59 on said rods and abutments, such as the ends of cylinders 60 carried by the upper rudder section. One end of each rod 58 bears against the upper surface of the lower rudder section and the upper end of each rod is loosely received in a guide bracket 61 mounted on the upper rudder section. So long as the two rudder sections are locked together, springs 56 and 57 are inoperative, but the moment locking bars 49 are moved to disengage blocks 51 from hooks 53, said springs will catapult the rudder section into space.

The release of said upper rudder section, the parachute housing and the cabin are, of course, under the control of one of the passengers, usually the pilot. In the preferred arrangement, an operating lever adjacent the pilot's seat 63 is attached by flexible elements such as chains or ropes 64 to rotatable elements, preferably levers 65 mounted on a shaft 66 journaled in bearings 67 in the craft body. Said shaft carries levers 68 attached by links 69 to the retractile bars 38 which project into slots 40 for retaining the parachute housing and cabin against movement rearwardly of the craft. Shaft 66 also carries levers 70 to which are attached pins 71 extending through guide ways 72 in a cross partition 73. Interposed between partition 73 and collars 74 on pins 71, and surrounding said pins are coil springs 75. The free ends of levers 70 are normally located above the horizontal dead center of shaft 66 so that the normal tendency of springs 75 is to force the retractile bars 38 into slots 40. Attached to levers 65 and to the slidable locking bars 49 in the lower rudder section are flexible elements 76 whereby movement of levers 65 to retract bars 38 will also effect release of the catches or hooks 53 that retain the upper rudder section in place. Movement of the several parts can be adjusted as desired but preferably, the upper rudder section is released somewhat in advance of the parachute housing. In order to insure substantial instantaneous release or freeing of the parachutes from the housing, the latter may be catapulted into space by coil springs 84 on pins 77 pivoted to levers 80 on a shaft 78. The springs abut projections 79 on the craft body and levers 80, which project through elongated slots 81 in partition 35 and slots 82 in the bottom wall of the parachute housing, engage against a partition 83 in said housing.

Briefly summarizing the operation of the preferred form of apparatus, movement of operating lever 62 rotates shaft 66 and, by means of lever 65 and ropes 76, moves the locking bars 49 to free hooks 53, permitting the upper rudder section to be projected into space by springs 56 and 57. Rotation of shaft 66 also effects retraction of bars 38 so that the parachute housing, with a clear path to the rear thereof by reason of the removal of the upper rudder section, is projected into space by springs 84. The parachutes are thus freed, the pilot chute opening first and then the load sustaining parachute. The retraction of bars 38 also releases the cabin, so that the hooks 36 under the influence of springs 39, or the conjoint influence of said springs and the opening parachute, are disengaged from their locking recesses 37 in partition 35 and the cabin thereafter supported by the parachute.

In the embodiment of the invention illustrated in Figs. 16 to 21, the load lines of the main parachute are attached directly to the passengers. The rudder is of the sectional type previously described and the upper section of said rudder and the parachute housing, in the modified construction are removed as in the preferred structure. This modified arrangement is especially designed for use in the "two seater" type of plane, the craft in this instance having two seats 90, 91, for the two occupants. The seats are of novel construction to facilitate escape, so to speak, of the occupants in an emergency. That is, each seat comprises fixed supports or standards 92 to which the seat back 93 is pivoted. The rear edge of the seat bottom 94 is also pivotally supported on said standards but the front edge of said seat bottom is collapsibly supported by pins 95 resting on bars 96 slidable in ways 97 on the side walls of the passenger compartment. Each bar 96 is cut away as at 98 so that by moving the bar rearwardly, pins 95 of the front seat will pass over the front ends of the bars and the pins of the back seat will pass through the cut away portions, thereby permitting the seat bottoms to swing downwardly. This movement of bars 96 is effected by ropes or chains 99 attached to said bars and levers 68 on shaft 66.

The back of rear seat 91 is releasably supported by a cross bar 100, one end of which rests in a socket 101 and the other end of which rests in a recess 102 in a pin 103 slidable in a guide 104 but normally held in its bar supporting position by a spring 105. The connections for releasing the upper rudder section and parachute housing are operable either by the lever 83 or an auxiliary lever 83ª adjacent the rear seat and connected to said lever 83ª and to said pin 103 is a rope or chain 106 whereby when said levers are rocked to release the rudder and housing, pin 103 will be retracted and back supporting bar 100 released. The back, thus unsupported, will swing downwardly and rearwardly. The back of front seat 90 is supported by links 107 from, and moves in unison with, the back of the rear seat. A spring 108, on bar 100, between a collar 109 on the bar and an abutment 110 on the seat back causes the bar to be moved out of socket 101 when pin 103 is retracted to free the bar.

The space in which the main parachute 30 is stored, is normally closed at its forward end by a partition 111 loosely held in place by the parachute housing so that it is free to be displaced upon removal of the housing to clear the rear of the space occupied by the passengers. When the craft is to be abandoned in an emergency, one of the levers 83, 83ª, is manipulated to permit removal of the upper rudder section and parachute housing just as in the preferred structure. Actuation of either of said levers also withdraws pin 103, to free the seat back supporting bar 100, and moves seat bottom supporting bar 96 rearwardly to permit collapse of both seat bottoms. As a result, the bodies of the passengers will meet with little, if any, resistance, when pulled rearwardly by the opened parachute. In other words, by collapsing the seats, the passengers do not have to raise themselves over the backs of the seats nor can their lower extremities be caught under the seat bottoms. Upon removal of the parachute housing, the partition 111 falls from the rear of the passenger space leaving an unobstructed passage through the body of the craft through which the passengers are pulled by the opened parachute.

What I claim is:

1. In an airplane, a rudder composed of two sections, one section being pivoted on the plane body, locking projections on the second section, a locking bar slidable in the pivoted section and engaging said projections to lock the two sections together, and means for moving said bar to disengage it from said projections and release said second section.

2. In an airplane, a rudder composed of a pivoted section and a detachable section, locking projections on said detachable section, a locking bar slidably carried by the pivoted section and wedged into engagement with said projections, and means for disengaging said bar and projections to release said detachable section.

3. In an airplane, a rudder composed of one section pivotally attached to the plane body and a second section detachably secured to the pivoted section, a series of wedge shaped locking projections on one rudder section, catches on the other section engaging said projections, means yieldingly urging said projections and catches in wedging engagement, and means for disengaging said catches and projections.

4. In an airplane, a rudder composed of one section pivotally attached to the plane body and a second section detachably secured to the pivoted section, a series of wedge shaped locking projections on one rudder section, catches on the other section engaging said projections, means yieldingly urging said projections and catches in wedging engagement, means for disengaging said catches and projections, and means for projecting said detachable section into space upon release of the catches.

5. In an airplane, a body comprising a cabin, a parachute, a housing for said parachute at the rear of said cabin and forming a part of said body, a rudder composed of a section pivoted to said body and a second section detachably secured to the pivoted section, and wholly separable from the plane, means for releasably securing said parachute housing to said body, said securing means urging said housing forwardly of the plane against the adjacent portion of the plane body, and means for releasing the detachable section from the pivoted section of the rudder and the housing and cabin from the plane body.

6. In an airplane, a body, a cabin detachably secured to the upper surface of said body, a parachute housing detachably secured to the upper surface of said body and abutting against the rear wall of said cabin, wedge means for urging said housing forwardly against said cabin, and a parachute in said housing attached to said cabin, and means for releasing and freeing said housing, parachute and cabin.

7. In an airplane, a body having supporting members therein, a cabin detachably supported on the upper surface of said members, cooperating locking elements on said cabin and members, a parachute housing detachably secured on the upper surface of said members against the rear wall of said cabin, cooperating locking elements on said members and housing, means for releasably urging all of said elements into locking engagement, and means for releasing said last mentioned means to free said housing and cabin.

8. In an airplane, a body having a longitudinally extending partition disposed transversely thereof, a cabin supported on the upper surface of said partition, cooperating locking elements on said cabin and partition for securing the cabin to the partition, a parachute housing on the upper surface of said partition abutting the rear wall of the cabin, cooperating locking elements on said housing and partition for retaining the housing on the partition, said housing having an opening in one wall thereof, a retractile tapered pin, means for yieldingly urging said tapered pin into engagement with the walls of said opening to hold said locking elements in interlocking engagement, and means for withdrawing said pin from said opening to release said housing and cabin.

9. In an airplane having a parachute housed therein, a rudder composed of one section pivoted on the plane and a second section detachably secured to the pivoted section, said second section being normally located to the rear of said parachute but freely separable from the plane when detached from the pivoted section, normally inoperative means for mechanically projecting said detachable second section from the plane, and means for releasing said detachable section and rendering said projecting means operable, said pivoted section remaining operatively associated with the plane.

10. In an airplane having a parachute housed therein, a rudder composed of two sections, one of said sections being pivoted on the plane body, interlocking elements carried by the two sections directly securing the other section to the pivoted section, means for effecting disengagement of said interlocking elements, the other section of the rudder being freed from the pivoted section and from the plane upon disengagement of said elements, and means for releasing said parachute.

11. In an airplane having a parachute housed therein, a rudder composed of two sections, one of said sections being pivoted on the plane, interlocking elements securing the other section to the pivoted section, said other section being freed from the pivoted section and plane upon disengagement of said elements, means for disengaging said elements, mechanical means for projecting said other section from the plane upon disengagement of said elements, and means for releasing said parachute.

12. In an airplane having a rudder composed of two sections, releasable spring means for moving one of said sections to clear the plane, means operable to maintain said spring means normally inoperative, said section of the rudder being automatically separated from the plane by said spring means upon release of said holding means, and means for releasing said holding means.

13. In an airplane having a parachute housed therein, a rudder composed of upper and lower sections with the upper section disposed rearwardly of said parachute, said upper section being detachable and separable from the plane to prevent said parachute becoming entangled therewith, and means for separating said upper section from the plane, the lower section of said rudder remaining operatively associated with the plane.

14. In an airplane having a rudder composed of two sections, one of said sections being pivotally mounted on the plane body, connections between said pivoted section and the other section for securing said two sections together, said other section being completely detached from the plane upon release of said connections, and means for releasing said connections.

15. In an airplane having a parachute housed therein, a rudder having an upper portion and lower section located on the plane rearwardly of said parachute, means for releasing the upper portion of said rudder from the lower section and plane and means for clearing away said upper portion when released to permit unobstructed movement of the parachute rearwardly of the plane, the remaining portion of said rudder being retained operatively associated with the plane.

SOLOMON LEE VAN METER, Jr.